Figures 1, 1A:
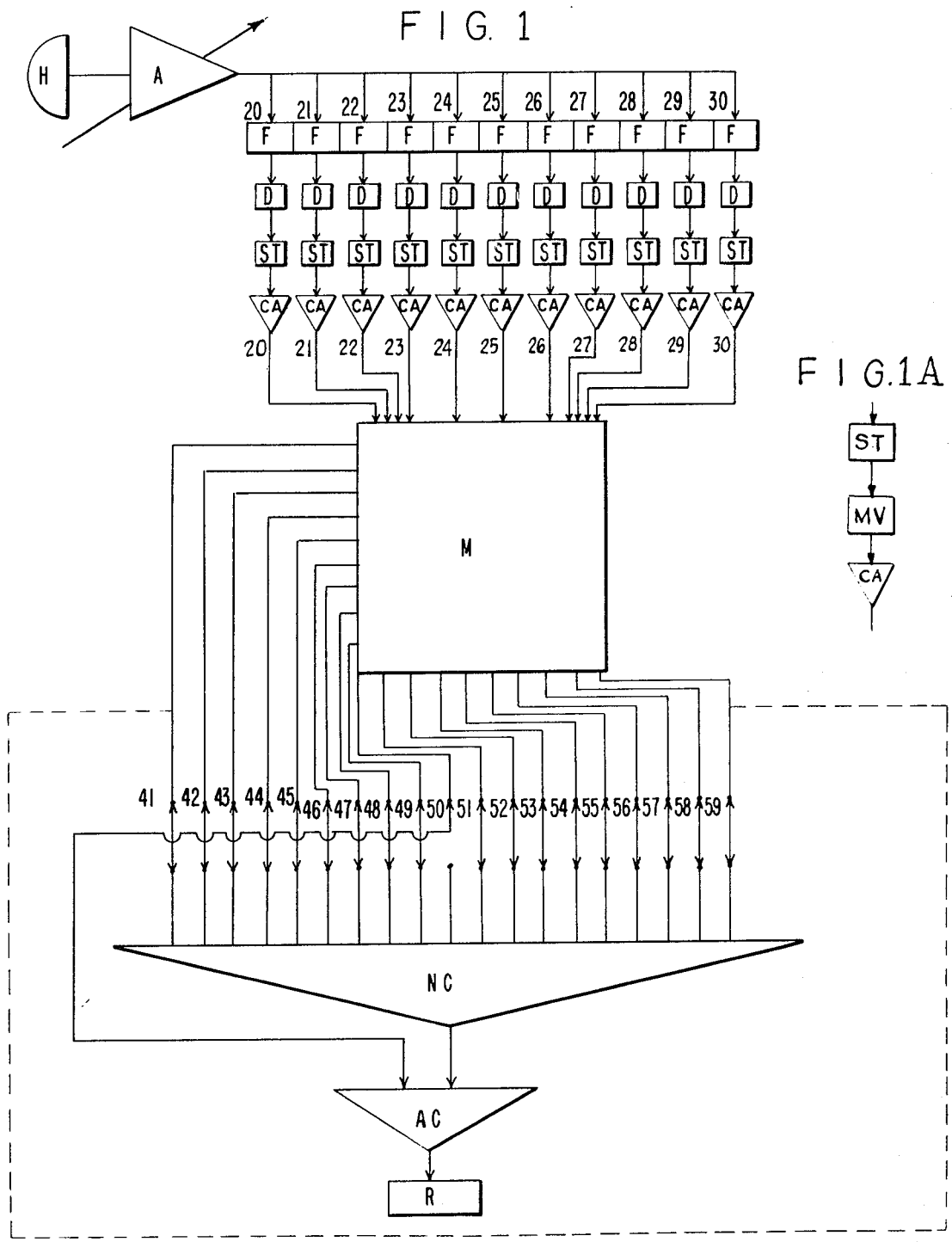

United States Patent

[11] 3,629,795

[72] Inventor Kern M. Bowyer
Wilmington, Del.
[21] Appl. No. 219,341
[22] Filed Aug. 24, 1962
[45] Patented Dec. 21, 1971
[73] Assignee E. I. du Pont de Nemours and Company
Wilmington, Del.

[54] UNDERWATER PRESSURE PULSE DETECTOR
3 Claims, 3 Drawing Figs.
[52] U.S. Cl. .................................................. 340/5 R,
340/6 R, 340/15
[51] Int. Cl. .................................................. H04b 11/00
[50] Field of Search .......................................... 325/323–326,
333, 452; 328/133; 340/3, 5, 6, 15,
15.5, 16; 343/17.2, 113, 113.2; 181/.5, .51, .53,
.53 B

[56] References Cited
UNITED STATES PATENTS
3,138,778 6/1964 Dulin ........................... 340/15

Primary Examiner—Richard A. Farley
Attorney—Samuel S. Blight

CLAIM: 1. An assembly for automatically detecting a pair of pressure pulse sequences emanated from a longitudinal array of spaced explosive elements detonated in the ocean in a manner such as to form two parallel detonation trains travelling in opposite directions relative to each other, the periods of each of the pair of pressure pulse sequences received at any angle from said array varying according to said angle and being the same at a normal angle to said array, the periods of pressure pulse sequences expected to be received at different angles from said array being known, and the sum of the periods of a pair of pressure pulse sequences received at any angle from said array being equal to $2T_0$, where $T_0$ is the period of the pulse sequences emanating in a normal direction from said array, which assembly comprises a. a pressure transducer;
b. an amplifier with automatic gain control coupled to said pressure transducer;
c. a frequency separator coupled to said amplifier and having $n$ frequency-band elements each of which passes a narrow band of frequencies, said frequency-band elements collectively passing all frequencies expected at all angles from said array and being so arranged that their center frequenceies provide equal period increments between successive elements;
d. an integrating detector coupled to each of said frequency-band elements;
e. a triggering device coupled to each integrating detector;
f. a sorting circuit coupled to said triggering devices, said sorting circuit having a plurality of conductors adapted to carry an output signal therefrom when signals are received from at least two different triggering devices, the number of said conductors being equal to $2n-3$, $n$ being as defined above, one of said conductors carrying an output signal when signals have been passed by two frequency-band elements whose center frequencies correspond to periods which add up to one sum, another to a different sum, etc., for all possible sums;
g. a logic circuit coupled to said sorting circuit, said logic circuit being adapted to produce an electrical impulse signal upon reception of (1) an output signal from an output conductor carrying a signal when signals have been passed by two frequency-band elements whose center frequencies correspond to periods which add up to $2T_0$ and (2) signals from no other output conductors.

INVENTOR
KERN M. BOWYER
ATTORNEY

INVENTOR
KERN M. BOWYER

UNDERWATER PRESSURE PULSE DETECTOR

This invention relates to an assembly for automatically detecting the presence of a pair of pressure pulse sequences the sum of whose periods is known.

Recently, a need has arisen for acoustic sources which emit a coded acoustic signal and are effective underwater for purposes of communication between a submerged vessel and an air- or surface-craft, as well as for triggering a mechanism under the surface of the water on command from the surface. In answer to this need, an explosive sound source emitting pressure pulse sequences of controllable period characteristics has been developed. This source is a longitudinal assembly of spaced explosive elements connected in sequence by a detonation-transmitting means. The assembly is initiated at the center or two ends thereof, thereby forming two arrays of successively detonating elements, i.e., two different parallel detonation trains travelling in opposite directions relative to each other. Each explosive element is the center of a pressure front or pulse. Since these centers are axially displaced from each other in the arrays, each array is a Doppler sound source, i.e., the time interval between the arrival of successive pulses from each array at a specified receiving point, or the period of the pulse sequence from each array, varies according to the angle between the receiver and the longitudinal axis of the assembly. However, the geometry of the explosives assembly is such that the sum of the periods of the two pressure pulse sequences is independent of the angle of observation, and, at any angle from the assembly, is twice the period of the pulse sequence emanating in a normal direction from either array, this normal period being the same for the two arrays. The period of the pulse sequences emanating normal from the arrays as well as at the other angles therefrom is determined by the distance between explosive elements and the time required for the detonation to be transmitted between elements and therefore is a controllable factor.

The explosive sound source also may be an assembly for producing two or more pairs of such pressure pulse sequences consecutively, the sum of the periods of each pair differing from that of other pairs.

When the coded signal, or pair of pressure pulse sequences, is received at an unmanned station below the surface of the ocean, a means must be provided at the station by which the incoming sound may be sorted; a determination made of (1) the presence of two pulse sequences having a predetermined total period and an intensity level above the level of ambient noise in the ocean, and (2) the absence of other signals having an intensity level above that of the ambient noise; and an electrical signal produced to indicate that conditions (1) and (2) have been met. Also, for manned stations and aircraft, although these operations can be done by a human operator, it is convenient to have them done automatically.

It now has been found that a pair of pressure pulse sequences emanated from a longitudinal array of spaced explosive elements detonated in the ocean in a manner such as to form two parallel detonation trains travelling in opposite directions relative to each other, the periods of each of the pair of pressure pulse sequences received at any angle from said array varying according to said angle and being the same at a normal angle to said array, the periods of pressure pulse sequences expected to be received at different angles from said array being known, and the sum of the periods of a pair of pressure pulse sequences received at any angle from said array being equal to $2 T_o$, where $T_o$ is the period of the pulse sequences emanating in a normal direction from said array, can be detected automatically when an assembly is used which comprises (a) a pressure transducer adapted to receive the pressure pulses and convert them into electrical impulses; (b) an amplifier with automatic gain control coupled to said pressure transducer; (c) a frequency separator adapted to separate the electrical impulse signals into various frequency components, said frequency separator being coupled to said amplifier and having $n$ frequency-band elements each of which passes a narrow band of frequencies, said frequency-band elements collectively passing all frequencies expected at all angles from said array and being so arranged that their center frequencies provide equal period increments between successive elements; (d) an integrating detector coupled to each of said frequency-band elements, said integrating detector being adapted to convert the AC signal from said element into a DC signal; (e) a triggering device coupled to each integrating detector, said triggering device being adapted to produce an output signal only when the input signal thereto attains a preset level above the ambient noise level of the ocean; (f) a sorting circuit coupled to said triggering devices, said sorting circuit having a plurality of conductors adapted to carry an output signal therefrom when signals are received from at least two different triggering devices, the number of said conductors being equal to $2n-3$, $n$ being as defined above, one of said conductors carrying an output signal when signals have been passed by two frequency-band elements whose center frequencies correspond to periods which add up to the one sum, another to a different sum, etc., for all possible sums; and (g) a logic circuit coupled to said sorting circuit, said logic circuit being adapted to produce an electrical impulse signal upon reception of (1) an output signal from an output conductor carrying a signal when signals have been passed by two frequency-band elements whose center frequencies correspond to periods which add up to $2 T_o$, and (2) signals from no other output conductors.

In a preferred embodiment of the detection assembly of this invention, the sorting circuit, i.e., a circuit which sorts the signals according to the combined characteristics of their periods, comprises a core matrix and core-driving amplifiers, each core-driving amplifier being coupled (1) to a triggering device and (2) to the core matrix, one row (X-coordinate) and one column (Y-coordinate) of said matrix being constructed of a conductor from each of the core-driving amplifiers. The matrix has a saturable toroidal core at each intersection of the conductors forming the columns and rows with the exception of the intersections of conductors leading out of the same core-driving amplifier. The matrix is "set" when current passes through intersecting conductors and reverses the magnetic state or saturation of one or more cores. The "set" matrix is "reset" by application of a current to a conductor which links all of the cores in the matrix in the same direction. To carry an output pulse from the matrix, a plurality of labeled conductors are provided, each labeled conductor passing through all of the cores located at the intersection of two conductors from two core-driving amplifiers on the same channel as two frequency-band elements whose center frequencies correspond to periods which add up to the same sum. Resetting of any set cores causes current to flow through this conductor to the logic circuit.

Figure 2:
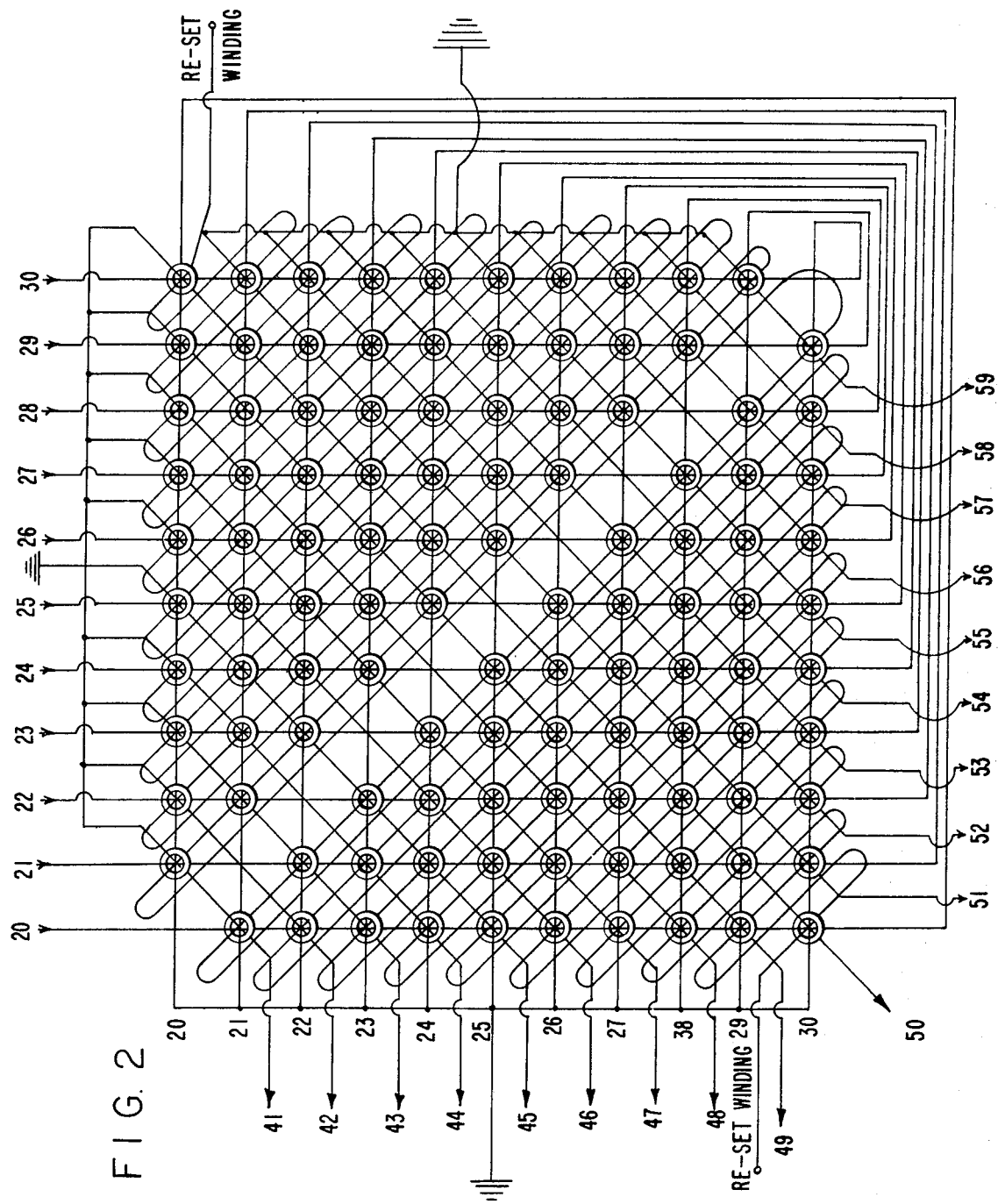

In order to describe the invention more fully, reference is now made to the accompanying drawings in which FIG. 1 is a block diagram of the present assembly, FIG. 1A illustrates a modification of the assembly of FIG. 1, and FIG. 2 is a schematic drawing of one element of the assembly, i.e., a core matrix.

Referring now to the drawings in greater detail, in FIG. 1 the pressure transducer is a hydrophone, H; A is an amplifier with automatic gain control; the frequency separator is a comb filter bank, the latter comprised of 11 filters denoted by F and numbered 20 through 30, each filter passing a narrow band of frequencies and all 11 filters collectively passing all frequencies expected at all angles from the explosives array emitting the pressure pulse sequences to be detected, the 11 filters being so arranged that their center frequencies give equal period increments between adjacent filters; D represents an integrating detector coupled to each filter F and rectifying the AC signal put out by the filter; the triggering device is a Schmitt trigger ST coupled to each integrating detector and producing an output signal only when the input level thereto exceeds its preset level; the core-driving amplifier CA coupled to each Schmitt trigger adjusts the signal level so as to apply a "one-half current" level to the core matrix M, i.e., the current level from any one core-driving amplifier to the matrix is half that required to reverse the magnetic state of a core; the 11 input lines into the core matrix are numbered 20 through 30, corresponding to the number of the filter on the same channel as the core-driving amplifier from which the line leads; the 19 output lines from the matrix are numbered 41 through 59; all output lines from the matrix except line No. 50 are connected through a switch to a multiple-input "NOR"-circuit NC, which together with an "AND"-circuit AC constitutes the logic circuit. The NOR circuit produces an output pulse only if all of the input lines are inactive; the output of the NOR circuit and the signal from the output line No. 50 are fed to the AND-circuit AC, which produces an output when, and only when, line No. 50 has an output and the NOR circuit has an output; R represents a response mechanism triggered by the signal from the AND circuit. The area of the block diagram enclosed in dotted lines, i.e., the logic circuit, can be repeated one or more times to provide a means of detecting two or more consecutive pairs of pulse sequences of different total periods. In this case, output lines from the core matrix will be connected through a switch to as many NOR circuits as there are pairs of pulse sequences to detect, all output lines except the line on which a signal is expected being connected to the NOR circuit. For example, in the connections to one NOR circuit all lines except No. 50 will be connected, in connections to another all lines except No. 51, etc. The output from each NOR circuit and the line on which a signal is expected is fed to an associated AND circuit, which triggers the response mechanism when these two lines have outputs. Since the pairs of pulse sequences will be emitted in a known consecutive order, the response mechanisms associated with each different logic circuit will be triggered in the same consecutive order, and the "message" will be the correct one.

If the two pulse sequences of any pair to be detected are produced nonsimultaneously, the assembly of FIG. 1 will be modified by inserting an astable multivibrator MV between each Schmitt trigger and core-driving amplifier in the manner shown in FIG. 1A. The multivibrators will lengthen the signals from the Schmitt triggers and allow the extended pulse sequences to go through the amplifiers for a preset length of time, such that the pulse from a subsequent sequence will pass through its amplifier while the extended pulse from the first sequence is going through its amplifier.

The core matrix shown schematically in FIG. 2 is comprised of 11 essentially parallel conductors arranged perpendicular to and intersecting 11 essentially parallel conductors, the number of conductors in each parallel group being equal to the number of filters in the comb filter bank shown in FIG. 1. A conductor from each core-driving amplifier forms one row and one column of the matrix, the conductors forming said row and column being numbered the same as the filter on the same channel as the core-driving amplifier from which the conductor leads. That is, the columns (Y-coordinates) of the matrix are numbered 20 through 30, and the rows (X-coordinates) are numbered 20 through 30, conductors having the same number originating from the same core-driving amplifier on the same channel as a filter having said number. The matrix has a saturable toroidal core at each intersection of the conductors forming the columns and rows with the exception of those intersections located on a diagonal line from the top left to the bottom right of the matrix, i.e., the intersections of two conductors originating from the same core-driving amplifier. A conductor linking all of the cores in the matrix in the same direction as shown in FIG. 2 constitutes a readout command winding which is used to "reset" any "set" cores in the matrix. This winding is pulsed periodically by some suitable means (not shown), e.g., by a free-running clock and driver mechanism. All of the cores located at the intersection of two conductors whose numbers total up to the same number have a separate conductor, i.e., a readout winding, passing through them. That is, a separate conductor passes through all of the cores located at the intersection of two conductors whose numbers total 41, those whose numbers total 42, etc., up to 59. The readout windings on the core matrix are the lines numbered 41 through 59. The latter are connected to the NOR circuit shown in FIG. 1.

A description of the explosives signalling device and how the present assembly operates to detect the signal therefrom, with particular reference to the circuitry depicted in FIGS. 1 and 2, now follows.

The explosives assembly for producing a pair of pressure pulse sequences whose detection is accomplished by use of the assembly of the present invention is comprised of two longitudinal arrays of explosive elements in a straight line equally spaced from each other a distance at least sufficient to prevent detonation from propagating between elements by influence, the elements in both arrays being connected in sequence by a detonation-transmitting means providing identical time intervals between the detonation of successive elements, and initiation of explosive elements in the assembly occurring at those elements, one from each array, which lie nearest to, or furthermost from, each other, the arrays being so disposed one to the other that the straight lines formed by the two arrays are parallel to the same line and that the straight line formed by one array is not intersected by a line normal to the straight line formed by the other array. The explosive elements may be single point charges or finite segments of a linear charge. For example, the array of explosive elements may be comprised of a series of aligned point charges connected in sequence by a detonation-transmitting means; or the array may be comprised of a linear charge uniformly coiled or bent, e.g., in the form of a zigzag or a helix, so that finite segments of the linear charge in the bends or turns are spaced apart in straight-line arrangement, the segments in any straight line forming explosive elements and being connected in sequence by the portions of the linear charge between the aligned elements.

In a linear array of spaced explosive elements, each explosive element is the center of a pressure front, and a pressure gauge placed at any selected position from such an array will register the arrival of pressure from successive elements as a succession of pressure pulses, the time interval between the arrival of successive pulses, or the period of the pulse sequence, depending on the spacing between explosive elements and the time interval between detonation of successive elements. Because of the axial displacement of the centers of the pressure fronts, each array is a Doppler sound source, the time interval between the arrival of successive pulses, i.e., the period of the pulse sequence, varying according to the angle between the receiver and the longitudinal axis of the array.

In the assembly in question, both arrays have the same spacing between explosive elements and the same interval between detonations of successive elements. As a result, there is the same spacing between pulse fronts emanating in a normal direction from the two arrays, i.e., the period of the pulse sequence emanating normal from both arrays is the same. This period is preselected and fixed by the spacing between elements and the nature of the detonation-transmitting means between elements. The period T of the pulse sequence emanating at any other angle from such an array is given by:

$$T = T_o + (d/C) \cos \Phi,$$

where $T_o$ is the period of the pulse sequence emanating in a normal direction from the array, $d$ is the spacing between explosive elements, $C$ is the sound velocity in the medium, and $\Phi$ is the angle between the direction from the sound source to the observer and the longitudinal axis of the array. In the described two-array assembly, because the two arrays are initiated at opposite ends relative to one another, the axial displacement of pulse centers is in opposite directions in the arrays with the result that there are two parallel detonation trains travelling in opposite directions from each other. At any observation point from the assembly, two pulse sequences $a$ and $b$ are received having periods $T_a$ and $T_b$, respectively. When the observation point is normal to the axes of the arrays, $T_a$ and $T_b$ are each equal to $T_o$. At other angles from the arrays, the period of the pulse sequence $a$ emitted by charge elements initiated in a sequence travelling in a direction away from the observer is $$T_a = T_o + (d/C) \cos \Phi$$

and the period of the pulse sequence $b$ emitted by charge elements initiated in a sequence travelling in an opposite direction from the initiation sequence producing $a$ and parallel thereto is $$T_b = T_o + (d/C) \cos(180° - \Phi) = T_o - (d/C) \cos \Phi$$

Adding the two periods:

$$T_a + T_b = T_o + (d/C) \cos \Phi + T_o - (d/C) \cos \Phi.$$

Since, $d$, $C$, and $\Phi$ are constant, $T_a + T_b = 2T_o$.

Thus, the sum of the periods of the pulse sequences emanating at any one angle from the assembly is independent of the angle of orientation of the receiver from the assembly, and is equal to twice the period of the pulse sequence emanating normal from the longitudinal axis of either array. These two pulse sequences are detected automatically by the assembly of this invention.

The frequencies passed by the filters in the comb filter shown in FIG. 1 are selected on the basis of the known periods of any two pulse sequences expected to emanate at any angle from the above-described explosives assembly. The normal period is known, being fixed by the known geometry of the charge. The center filter, No. 25, passes a frequency corresponding to this normal period. This period is one-half the sum of the periods of the pair of pulse sequences to be detected. The periods $T_a$ and $T_b$ of a pair of pulse sequences expected at other angles from the assembly is known by calculation from the above-given relationships.

Knowing the expected span of the periods of the pulse sequences emanating from the assembly, the filter bank is constructed so as to pass frequencies corresponding to this span of periods, the filters numbered No. 20 through No. 30 having center frequencies such that the periods corresponding thereto increase in constant increments from one filter to the next. For example, if the sound source is known to emit pulse sequences of a minimum period of 0.075 millisecond, a maximum period of 0.125 millisecond, and a normal period of 0.1 millisecond, the center frequencies of the filters will be such that there will be a constant increase of 0.005 millisecond from the period corresponding to the center frequency of one filter to that of the next for 11 filters; i.e., the periods corresponding to the center frequencies passed by filters No. 20 through No. 30 in consecutive order will be 0.075, 0.080, 0.085, 0.090, 0.095, 0.100, 0.105, 0.110, 0.115, 0.120, and 0.125 millisecond. Therefore, in this case, the center frequency of each of these filters will be 13.3, 12.5, 11.8, 11.1, 10.5, 10, 9.5, 9.1, 8.7, 8.3, and 8 kilocycles per second, respectively.

For purposes of illustrating the operation of the present assembly, it will be assumed that the two pulse sequences to be detected have periods corresponding to the center frequencies of filters No. 22 and No. 28 (the sum of these periods being twice the period corresponding to the frequency of filter No. 25). The pulse sequences to be detected, as well as other signals which may be present, arrive at the hydrophone, which converts the pressure impulses to electrical impulses. The signals are then amplified in the line amplifier having an automatic gain control whose level is set so that the average input level to the Schmitt triggers is below the trigger level. The amplified signals are then sent to the comb filter. The AC signals from the filters are converted to DC signals in the integrating detectors, and the signals from the latter are fed to the Schmitt triggers whose trigger level is set sufficiently high that the intensity level of ambient noise in the ocean is insufficient to cause an output signal to be produced therefrom. Accordingly, while filters No. 22 and No. 28 may be excited by ambient noise in the ocean, these signals will not be intense enough to produce an output on the Schmitt triggers. However, in this exemplary case the pair of pulse sequences emitted by the acoustic source used have periods corresponding to the center frequencies passed by filters No. 22 and 28; therefore, the inputs to the Schmitt triggers connected via the integrating detectors to filters No. 22 and No. 28 will be intense enough to produce outputs. Any other signals having an intensity level above the trigger level of the Schmitt triggers will not satisfy the necessary total period requirement as will be determined by the remainder of the circuit.

The outputs from the triggers are fed to the core-driving amplifiers, which in turn apply "one-half current" levels to the No. 22 and No. 28 X- and Y-inputs to the matrix (FIG. 2) (and to other X- and Y-inputs if signals of sufficient intensity and different periods have been received). For the signals to be detected, these "one-half currents" meet at four places in the matrix (i.e., at X(22), Y(22); X(28), Y(28); X(22), Y(28); and X(28), Y(22)), but only two of these locations have cores. These are X(22), Y(28) and X(28), Y(22). These two cores are then "set," or their magnetic state or saturation is reversed. It will be noticed that both of these cores lie on the diagonal signal output line labeled No. 50 (the sum of the periods of the signals passed by the No. 22 and No. 28 filters).

The "set" matrix is reset by means of the readout reset winding, which is wound so as to link all cores in the same direction. This winding is pulsed periodically, e.g., by a free-running clock and driver mechanism, so that any cores that have been set since the last clock pulse are reset to their initial state. Since cores X(22), Y(28) and X(28), Y(22) have been set, these cores will be reset and will cause an output pulse on their output signal line (No. 50). If no other cores have been set, no other output signal lines are pulsed.

The outputs from all of the signal lines from the matrix shown in FIG. 2 are fed into the input lines of the logic circuit depicted in FIG. 1. A switch connects these input lines, with the exception of line No. 50, to a multiple-input NOR circuit, which produces an output pulse only if all of the input lines are inactive. The output of the NOR circuit and the pulse from the input line No. 50 are fed to the AND circuit, which then produces an output. Thus if the coded signal is the only signal received having the intensity level expected from the coded signal, an output signal is produced. If other signals reach the logic circuit, no output signal is produced, Therefore, a mechanism or event will be triggered only by the coded signal.

In the described detecting assembly, the number of filters $n$ used in the comb filter may vary depending on the period span of the pulse sequences emitted by the acoustic source and on how narrow a filter bandwidth is desired. The minimum bandwidth used will depend on the bandwidth of the transmitted signal and will be comparable thereto. In the case described previously wherein more than one pair of pulse sequences are to be detected, the filter bank obviously must cover a range adequate to pass all periods which may be expected from any of the sources used.

Alternative to the core matrix in the sorting circuit, one may employ other devices such as a diode matrix.

The present assembly can be used with only one logic circuit even when the signal code is changed from time to time. For example, if the geometry of the explosives assembly used as the signalling means is altered periodically so as to produce a pair of pulse sequences whose periods add up to a different sum, the switch in FIG. 1 can be rotated so that the input lead to the AND circuit is connected to the output line from the core matrix (FIG. 2) corresponding to twice the period of the pulse sequence emanating normal from the explosives assembly.

In the present assembly, if there is the possibility that a received signal may be passed by two adjacent filters and thereby set a core adjacent to one located on the appropriate output line to prevent the NOR circuit from producing an output on a true signal, input lines No. 49 and No. 51 to the NOR circuit in FIG. 1 can be connected to line No. 50 at the switch. This will broaden out the effective bandwidth of the system, however.

The method of packaging the present assembly does not constitute part of this invention. However, it will be understood that, when used at an unmanned underwater station, all components will be either insensitive to water or packaged in one or more waterproof containers, and will be operative at great depths in the ocean. The packaging method used inside a submarine or aircraft will be any suitable method known to the art for packaging electrical components.

The explosives assembly for producing the pulse sequences detectable by the present assembly is described in detail in copending application Ser. No. 219,340 filed Aug. 24, 1962. The Doppler effect associated with the detonation of helical explosive charges is described in copending application Ser. No. 13,385, filed Mar. 7, 1960, now abandoned in favor of continuation-in-part application Ser. No. 275,464, filed Apr. 23, 1963.

The invention has been described in detail in the foregoing. Many modifications will be apparent to those skilled in the art and will not require departure from the spirit of this invention. Accordingly, I intend to be limited only by the following claims.

I claim:

1. An assembly for automatically detecting a pair of pressure pulse sequences emanated from a longitudinal array of spaced explosive elements detonated in the ocean in a manner such as to form two parallel detonation trains travelling in opposite directions relative to each other, the periods of each of the pair of pressure pulse sequences received at any angle from said array varying according to said angle and being the same at a normal angle to said array, the periods of pressure pulse sequences expected to be received at different angles from said array being known, and the sum of the periods of a pair of pressure pulse sequences received at any angle from said array being equal to $2T_o$, where $T_o$ is the period of the pulse sequences emanating in a normal direction from said array, which assembly comprises
   a. a pressure transducer;
   b. an amplifier with automatic gain control coupled to said pressure transducer;
   c. a frequency separator coupled to said amplifier and having $n$ frequency-band elements each of which passes a narrow band of frequencies, said frequency-band elements collectively passing all frequencies expected at all angles from said array and being so arranged that their center frequencies provide equal period increments between successive elements;
   d. an integrating detector coupled to each of said frequency-band elements;
   e. a triggering device coupled to each integrating detector;
   f. a sorting circuit coupled to said triggering devices, said sorting circuit having a plurality of conductors adapted to carry an output signal therefrom when signals are received from at least two different triggering devices, the number of said conductors being equal to $2n-3$, $n$ being as defined above, one of said conductors carrying an output signal when signals have been passed by two frequency-band elements whose center frequencies correspond to periods which add up to one sum, another to a different sum, etc., for all possible sums;
   g. a logic circuit coupled to said sorting circuit, said logic circuit being adapted to produce an electrical impulse signal upon reception of (1) an output signal from an output conductor carrying a signal when signals have been passed by two frequency-band elements whose center frequencies correspond to periods which add up to $2T_o$ and (2) signals from no other output conductors.

2. An assembly for automatically detecting a pair of pressure pulse sequences emanated from a longitudinal array of spaced explosive elements detonated in the ocean in a manner such as to form two parallel detonation trains travelling in opposite directions relative to each other, the periods of each of the pair of pressure pulse sequences received at any angle from said array varying according to said angle and being the same at a normal angle to said array, the periods of pressure pulse sequences expected to be received at different angles from said array being known, and the sum of the periods of a pair of pressure pulse sequences received at any angle from said array being equal to $2T_o$, where $T_o$ is the period of the pulse sequences emanating in a normal direction from said array, which assembly comprises
   a. a hydrophone;
   b. an amplifier with automatic gain control coupled to said hydrophone;
   c. a comb filter coupled to said amplifier and having $n$ filters each of which passes a narrow band of frequencies, said filters collectively passing all frequencies expected at all angles from said array and being so arranged that their center frequencies provide equal period increments between successive filters;
   d. an integrating detector coupled to each of said filters;
   e. a Schmitt trigger coupled to each integrating detector, said triggers having a trigger level above the ambient noise level of the ocean;
   f. a core-driving amplifier coupled to each Schmitt trigger;
   g. a core matrix coupled to said core-driving amplifiers, said core matrix having a plurality of conductors for carrying an output signal therefrom when signals are received from at least two different core-driving amplifiers, the number of said conductors being equal to $2n-3$, $n$ being as defined above, one of said conductors carrying an output signal when signals have been passed by two different filters whose center frequencies correspond to periods which add up to one sum, another to a different sum, etc., for all possible sums;
   h. a logic circuit coupled to said core matrix, said logic circuit being adapted to produce an electrical impulse signal upon reception of (1) an output signal from an output conductor carrying a signal when signals have been passed by two filters whose center frequencies correspond to periods which add up to $2T_o$ and (2) signals from no other output conductors.

3. An assembly according to claim 2, wherein an astable multivibrator is coupled to each Schmitt trigger and to each core-driving amplifier thereby replacing the coupling of each Schmitt trigger to a core-driving amplifier.

* * * * *